Figure 1:
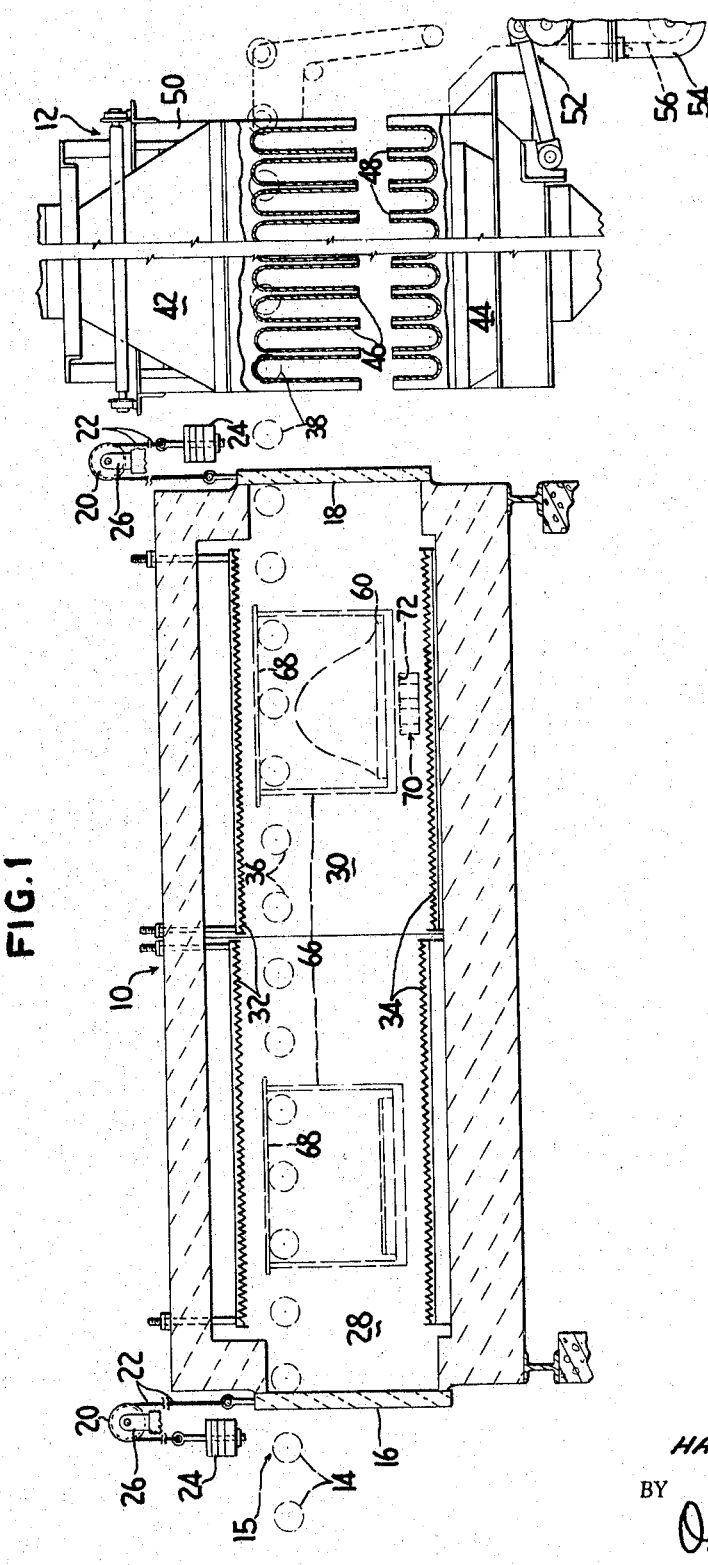

Jan. 17, 1967　　　H. E. McKELVEY　　　3,298,810
METHOD AND APPARATUS FOR BENDING AND TEMPERING GLASS SHEETS
Filed June 26, 1963　　　　　　　　　2 Sheets-Sheet 1

INVENTOR.
HAROLD E. McKELVEY
BY Oscar L. Spencer
ATTORNEY

Jan. 17, 1967      H. E. McKELVEY      3,298,810
METHOD AND APPARATUS FOR BENDING AND TEMPERING GLASS SHEETS
Filed June 26, 1963      2 Sheets-Sheet 2

INVENTOR.
HAROLD E. McKELVEY
BY
Oscar L. Spencer
ATTORNEY

United States Patent Office 3,298,810
Patented Jan. 17, 1967

3,298,810
METHOD AND APPARATUS FOR BENDING AND TEMPERING GLASS SHEETS
Harold E. McKelvey, New Kensington, Pa., assignor to Pittsburgh Plate Glass Company, Pittsburgh, Pa., a corporation of Pennsylvania
Filed June 26, 1963, Ser. No. 290,659
6 Claims. (Cl. 65—107)

This application relates to treating glass sheets and particularly concerns bending and tempering glass sheets.

The requirements of automotive stylists now demand that automobiles have a straight line extending obliquely downward from the vehicle roof toward the trunk. At the same time, they require unobstructed vision from side to side through the rear of the body of the automobile. Hence, the rear window, or backlight, as it is called in the art, is required to be long enough to extend in a gentle longitudinal curve across the entire width of the body of the car and have hooked ends extending forward along the sides of the vehicle body. At the same time, the width of the bent backlight forming the height of the curved backlight is required to be perfectly straight.

According to the prior art techniques as exemplified by U.S. Patent No. 2,901,866 to Harold E. McKelvey et al., flat glass sheets precut to the outline required were shaped to the desired curvature and tempered by supporting a glass sheet in a substantially horizontal plane in bending relation to a curved shaping surface of outline configuration facing upward and conforming to the shape desired for the glass sheet marginal portion adjacent its periphery after bending said sheet. The glass sheet so supported was introduced into a tunnel-like bending furnace where the glass sheet was heated to an elevated temperature sufficient to soften the supported glass sheet so that its marginal portion adjacent its periphery was brought into continuous contact with the curved outline shaping surface. In the tempering station, the bent glass was subjected to blasts of chilling fluid to impart a temper to the glass sheets.

Tempering changes the stress distribution throughout the glass to provide the tempered glass with a skin having a large compressive stress completely surrounding an interior that is stressed in tension. Since glass is notoriously strong when stressed in compression, the surface of tempered glass has greater resistance to impact than glass that is not so treated. Furthermore, even when the outer surface or skin of compression stress is broken, the locked-in tension stress of the glass sheet interior causes the glass sheet to shatter into a large number of very small, smoothly surfaced pieces. Untempered glass fractures into fragments having jagged edges. Therefore, tempered glass is safer than untempered glass because tempered glass is less likely to fracture and, even if it does fracture, the smaller, smoother fragments resulting from its fracture are less likely to cause bodily injury that the jagged fragments occurring on breakage of untempered glass.

In the past, the use of the gravity sagging technique for bending a glass sheet interior of the outline shaping surface that supports the bent glasss sheet adjacent its periphery to the desired shape described above has been employed successfully with outline-type molds. The latter molds are also suitable for tempering the glass sheet supported thereon because they provide minimum obstruction to the free flow of tempering fluid onto the major surfaces of the heat-softened, bent glass sheet. In fact, the requirement for tempering the entire glass sheet uniformly has made it mandatory that the molds be free of any structure that would obstruct the free flow of tempering fluid. Hence, the use of heat absorbers commonly employed in maintaining certain areas flat or for preventing cross sagging in curved windshields to be laminated after bending, as disclosed in U.S. Patent No. 2,720,729 to Ormond E. Rugg, is precluded for a tempering operation, because such heat absorbers carried by the mold or by its supporting carriage interfere with the free flow of tempering fluid against the major surfaces of the heated bent sheets.

The prior art technique, of necessity, could not avoid the establishment of some cross-sag in the bent glass sheet between the marginal portions adjacent the longitudinal side edges supported on the corresponding portions of the shaping surface. This cross-sag could not be avoided because it was necesesary to insure that every portion of the glass sheet be heated to a temperature sufficiently high for tempering. This resulted in certain portions being heated to higher temperatures than required for tempering, particularly when it was necessary to heat certain regions of the glass to higher temperatures than other regions in order to promote non-uniform bending.

Variations in thickness between glass sheets and non-uniformity in glass sheet thickness resulted in additional causes for certain regions of the glass sheet to be heated to a higher temperature than other regions. Such temperature variations resulted in the glass sheets developing cross-sag of a non-uniform character.

Automobile stylists accepted the uncontrolled cross-sag for a while and even designed their automobiles in such a manner that the backlights assumed a bulbous shape from roof to trunk. This bulbous effect was accomplished by sagging the glass sheet onto an outline shaping surface of concave elevation so that the cross-sag intermediate the supported longitudinal side edges bowed in the same direction as the longitudinal bend.

However, the bulbous look has been replaced by a more streamlined straight line for the height of the backlight. Therefore, it is now necessary to produce tempered glass sheets for use as backlights which are bent to complicated longitudinal bends about their transverse axis, yet are substantially flat, that is virtually free of cross-sag between their longitudinal side edges, particularly in the region between the rear of the automobile roof and the upper portion of the trunk.

The present invention has made it possible to fabricate bent, tempered glass sheets on outline molds of the type employed in the prior art to satisfy the demand of automobile stylists for the complicated shapes desired. The present invention accomplishes this result by the employment of an upward pressurized flow of hot fluid against the undersurface of the glass in the area between the supported side edges that was subject to cross-sag using prior art techniques. The fluid is preferably a mixture of burned commercial heating gas and air. Excess air is provided to moderate the temperature of the combustion products and to provide sufficient flow of fluid to counteract the force of gravity on the unsupported central portion of the heated glass.

While the present invention is suitable for use in a continuous process wherein a series of molds are conveyed seriatim through a tunnel-like furnace and removed therefrom for tempering when the glass sheets sag into contact with the mold shaping surface, it is preferred that the present invention employ a step-wise process wherein glass laden molds are moved periodically longitudinally of the furnace from a preheat zone where the glass is heated to an elevated temperature below its deformation temperature to a bending zone within the bending furnace where the glass reaches its deformation temperature and is shaped into conformity with the mold shaping surface at the last or bending zone of the furnace. This latter operation permits the proper alignment of nozzles for directing the upward flow of hot fluid against the undersurface of the glass sheet within the area to be buoyed against cross-sag during the entire period that the glass sheet is present in the bending zone.

When used with bending molds of concave elevation having the curvature symmetrically disposed about the transverse axis extending centrally of the length of the shaping surface, it has been found desirable to apply the hot fluid upwardly only in the central region of the glass sheet. The hot fluid moves outward from the central area of the bent glass sheet and helps moderate any temperature gradients established lengthwise of the glass sheets by the non-uniform heating of the sheet necessary to produce a non-uniform bend.

The upward application of hot fluid in the bending zone according to the present invention is instrumental in buoying the glass to prevent cross-sag and also tends to equalize the temperature along the length of the bent glass sheet, thereby helping to improve its uniformity of temper.

The present invention will be better understood from the description of a typical embodiment which follows.

Figure 3:
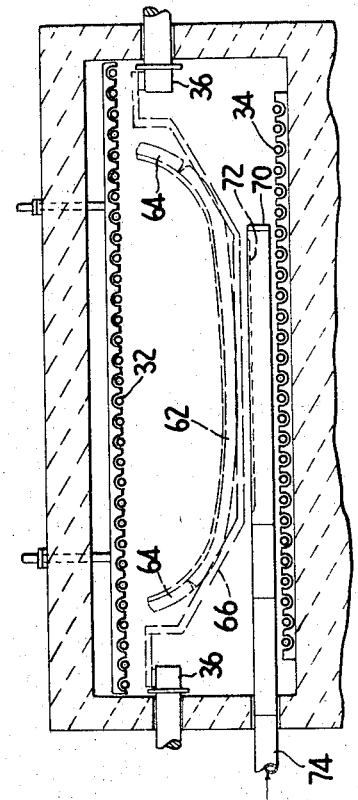
Figure 2:
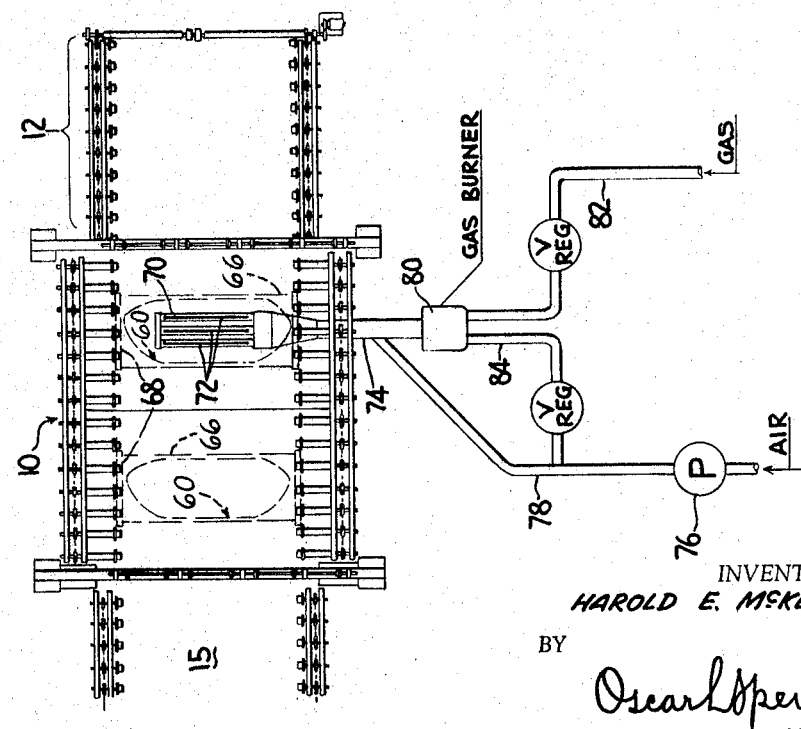

In the drawings, which form part of the present disclosure and where like reference numbers refer to similar structural elements, FIG. 1 is a longitudinal section, partly in elevation and partly framentary, of a glass sheet bending and tempering apparatus provided with the present invention;

FIG. 2 is a fragmentary plan view showing how the present invention is employed in the bending and tempering apparatus of FIG. 1; and FIG. 3 is a schematic cross-section showing the relation of the present invention to the bending zone of a furnace, partcularly that of nozzles through which hot fluid is directed toward the undersurface of a glass sheet supported on a sectionalized outline mold having an upper shaping surface to which the glass sheet is conformed.

As seen in the drawings, a tunnel-like furnace 10 and a tempering station 12 are disposed in end-to-end relation along a horizontal stub roll conveyor 14, which has its origin at a loading station 15 located outside the entrance to the furnace 10.

The furnace 10 is provided with an entrance door 16 and an exit door 18. Each door is suspended from a pulley 20 by means of a cord 22. A counterweight 24 is attached to the other end of the pulley cord 22. The pulley axle is pivotally supported on an overhead bracket 26.

The furnace 10 comprises a preheat zone 28 and a bending zone 30 forming two parts of an elongated chamber of the furnace 10. Each of the zones has a series of upper heating elements 32 suspended from the roof and a series of bottom heating elements 34 supported over the floor of the furnace.

Each series of upper and lower heating elements extends lengthwise of the zone in which it is located parallel to the other heating elements in the series. Each heating element is supported on an individual bracket which is vertically adjustable in a manner well known in the art. Also, each heating element 32 or 34 is electrically coupled to an individual circuit which includes a voltage control means (not shown) for regulating the current furnished through each heating element.

The stub rolls 36 of the portion of the horizontal stub roll conveyor 14 traversing the furnace 10 extend inward of the walls of the furnace, while the stub rolls 38 located beyond the exit door 18 of the furnace 10 are supported on suitable supports extending through the tempering station 12.

The tempering station 12 comprises an upper plenum chamber 42 and a lower plenum chamber 44. The upper plenum chamber 42 terminates in a series of downwardly extending slot-type nozzles 46 whose lower orifices are curved in elevation. The lower plenum chamber 44 terminates in a series of upwardly extending slot type nozzles 48 whose upper orifices are curved to a shape complementary to the shape of the orifices of the nozzles 46. The orifices are spaced from one another to enable an outline mold supporting a bent glass sheet to be disposed therebetween. A unitary frame 50 connects the plenum chambers 42 and 44 while providing clearance for mold movement.

The frame 50 is reciprocated by a crank drive 52 driven from a motor 54 through a chain drive 56. The motor 54 is actuated in unison with a compressor (not shown) for supplying air under pressure through flexible couplings to the upper and lower plenum chambers in a manner well known in the art. The curved slots are thus reciprocated along an axis parallel to the path of movement of the horizontal stub roll conveyor while cold air is supplied under pressure through the nozzles toward the major surfaces of the curved glass sheets in the tempering station 12 immediately after the latter leave the bending zone 30 of the furnace 10.

Molds 60 of the outline type comprising a central mold section 62 and pivotal end sections 64 are each supported on a mold support carriage 66 having runners 68 actuated for movement along the conveyor 14 when rolls 36 and 38 are rotated.

The apparatus described hereinabove is typical of a multi-stage bending and tempering furnace of the prior art. When the entrance door 16 is provided with a window, an operator at a glass loading station just outside the door can see when the end sections 64 of the mold 60 have pivoted into the closed position at the bending zone 30, signifying that the glass sheet has conformed to the mold shaping surface. The operator presses a button, which operates motors opening the exit door 18, the entrance door 16 and causing the conveyor 14 to transport the mold in the bending zone 30 to the tempering station 12, to transport another mold from the preheat zone 28 to the bending zone 30 and still another mold from the loading station 15 to the preheat zone 28 in accordance with a prearranged sequence well known in the art. A previous mold carriage 66 is simultaneously removed from the tempering station to make room for the incoming bent glass sheet and its supporting apparatus.

The present invention provides a series of parallel slot nozzle boxes 70 having exit orifices 72 at their upper ends. The nozzles are located within the area projected by the outline shaping surface of the mold below the position occupied by the central region of the bent glass sheet in the bending zone 30. The nozzles 70 supply hot fluid under pressure in a vertical direction to the undersurface of the glass. The slot nozzles 72 extend transversely of the longitudinal axis of conveyor 14.

A manifold 74 supplies a mixture of air and burned gas to the nozzle boxes 70. A compressor 76 comprising a pressure regulator P furnishes air through an air supply line 78 to the manifold 74, while a gas burner 80 fed by a gas line 82 and an air line branch 84 at rates of flow controlled by volume regulators (V REG), and provided with the usual pilot lines, valves, etc. (not shown) furnishes combustion products to the manifold. The compressor 76 and gas burner 80 are preferably operated continuously at rates sufficient to furnish an upward flow of heated gases at a rate to provide the requisite lifting force and temperature to insure avoidance of cross-sag and improvement of the temperature uniformity of the glass sheet.

The present invention is used to bend and temper glass sheets by supporting a flat glass sheet in bending relation to a curved shaping surface of outline configuration conforming to the shape desired for the glass sheet after bending as performed in the prior art, heating the glass sheet while so supported to an elevated temperature sufficient to soften the sheet so that its marginal portion adjacent its periphery is brought into continuous contact with said curved shaping surface and wherein the heated sheet tends to sag intermediate the side edge portions of its said marginal portion supported on said curved shaping surface, and suddenly chilling the bent sheet so supported to impart a temper thereto. The present invention is accomplished by heating said flat sheet to a temperature below its deformation temperature in the absence of an application of fluid in an upward direction against the undersurface of the glass sheet, then applying fluid in an upward direction against the undersurface of the glass sheet intermediate its supported side edge portions at a temperature between about 1100 degrees Fahrenheit and 1150 degrees Fahrenheit at a pressure sufficient to support said intermediate portion against substantial cross-sag while heating the glass sheet to its deformation temperature. The upward force is continued when said marginal portion is in contact with said curved shaping surface and the temperature of the glass sheet is such that the glass sheet is susceptible of sagging intermediate its said supported side portions. The upward flow of fluid thereby inhibits the sagging in said portion of the glass sheet subjected to said pressurized fluid while the glass sheet is exposed to an environment sufficiently hot to cause the glass sheet to develop undesired cross-sag.

Glass sheets of various commercial soda-lime-silica compositions such as commercial plate glass, sheet glass and float glass comprising the following ingredients in parts by weight:

| | Percent |
|---|---|
| $SiO_2$ | 68 to 73 |
| $R_2O$ (alkali metal oxide as $Na_2O$) | 12 to 15 |
| RO (CaO, MgO, etc.) | 12 to 15 |
| $Al_2O_3$ | 0.1 to 1.5 |
| $Fe_2O_3$ | 0.1 to 0.6 | having a nominal thickness of ¼ inch have cross-sag reduced to an unobservable amount by employing hot fluid at a temperature of between 1100 and 1150 degrees Fahrenheit, preferably about 1130 degrees Fahrenheit, supplied to provide an upward lifting force of 9 pounds through three elongated parallel slots ¼ inch wide by 24 inches long separated by 6 inches from slot to slot.

The slots through which the heated gas was supplied under pressure had their exit orifices disposed about 6 inches below the undersurface of the glass sheet. The slots 70 extend parallel to one another in a direction transverse to the axis of conveyor 14.

In order to provide the requisite temperature and pressure at the nozzle orifices, a Tate-Jones Universal Burner No. 800 manufactured by the Kutz Engineering Company of Pittsburgh, Pennsylvania, is employed to furnish 2,500,000 British thermal units per hour and air is furnished by the compressor at a rate of 1812 cubic feet per minute computed at standard conditions (atmospheric pressure and 60 degrees Fahrenheit), of which at least 400 cubic feet per minute are supplied through the burner 80. Combustion gas is supplied to the burner at a rate of 40 cubic feet per minute.

The continuous introduction of pressurized heated gas into the furnace imposes a superatmospheric pressure within the furnace. Thus, every time one or both doors 16 and/or 18 are opened, the superatmospheric pressure within the furnace causes an outward flow of gas from inside the furnace. This outward flow produces a barrier to the introduction of random cold air currents from the atmosphere surrounding the furnace into the furnace. Therefore, the imposition of a positive pressure within the furnace by the present invention insures against localized variations in temperature that result in non-uniform tempering.

The continuous introduction of pressurized heated gas into the bending zone inherently results in the undersurface of the glass sheet being subjected to the application of an upwardly directed heated fluid before the sheet comes into continuous contact with the curved shaping surface of the mold. The application of the heated fluid is continued while the glass sheet is heated and supported in continuous contact with the curved shaping surface.

In addition, the continuous introduction of hot gas at the preferred temperature of about 1130 degrees Fahrenheit into the bending zone 30 has improved the operation in other ways. The outline mold and the bottom surface of the supported bent glass tend to cool to the temperature of the heated fluid while the interior and upper portion of the glass attains a higher temperature. This lowers the viscosity of the bottom layer of the bent glass and enables it to retain its shape while en route to the tempering station. A quench of about 20 seconds at 8 ounces per square inch through opposing curved slot nozzles spaced vertically from one another to provide a curved space about 8 inches high with the bent sheet supported in the curved space is sufficient to temper glass so treated.

While the nozzles 70 of the illustrative embodiment extend longitudinally of the glass sheet, they may also be disposed transversely of the glass sheet. For example, 6 parallel slots extending parallel to the conveyor axis may be employed 6 inches below the glass using the same conditions of air and gas supply as enumerated above. Each slot is 12 inches long and ¼ inch wide and is separated from its adjacent parallel slot by 6 inch spacing. An upward pressure of 8 ounces per square inch produces an upward force of 9 pounds in the central area of the glass sheet. This is sufficient to eliminate observable cross-sag for ¼ inch nominal thickness glass.

The temperature of the heated fluid as well as the location and size of the upward force provided by the heated fluid cannot vary very much from optimum conditions. For example, in bending and tempering glass sheets ¼ inch thick, if the gas is furnished at a temperature in excess of 1150 degrees Fahrenheit, cross-sag occurs. If the temperature of the gas applied is below 1100 degrees Fahrenheit, the glass sheet is likely to become insufficiently tempered as determined by the size of particles of a fractured sheet.

If the heated fluid is supplied directly in other than the central region of the glass sheet, both with respect to its length and its width, the temperature pattern tends to depart from symmetry about its corresponding longitudinal and transverse axes, a factor inimical to producing a good temper pattern.

The manifold for supplying heated fluid may be constructed to feed the nozzle boxes at both ends or through a large number of fluid supply openings distributed therealong. Also, the system for supplying fluid may include an enclosed recirculating conduit, thus lessening the requirements for thermal input by as much as 80 percent, since a recirculating system minimizes heat losses.

The form of the invention shown and described in this disclosure represents an illustrative embodiment thereof. It is understood that various changes may be made without departing from the spirit of the invention as defined in the subject matter which follows.

What is claimed is:

1. In the art of bending and tempering glass sheets, wherein a flat glass sheet is supported in a substantially horizontal plane in bending relation to a curved shaping surface of outline configuration conforming to the shape desired for the glass sheet after bending and the glass sheet is heated to an elevated temperature sufficient to soften the sheet so that its marginal portion adjacent its entire periphery is brought into continuous contact with said curved shaping surface and wherein the heated sheet tends to sag intermediate the side edge portions of its said marginal portion supported on said curved shaping surface, and the bent sheet so supported is suddenly chilled to impart a temper thereto, the improvement comprising:

(1) heating said flat glass sheet to a temperature below its deformation temperature in the absence of an application of fluid in an upward direction against the undersurface of the glass sheet, (2) applying fluid in an upward direction against the undersurface of the glass sheet intermediate its supported side edge portions at a temperature between about 1100 degrees Fahrenheit and 1150 degrees Fahrenheit at a pressure sufficient to support said intermediate portion against substantial cross-sag while heating said glass sheet to its deformation temperature, (3) and continuing said upward force when said marginal portion is in contact with said curved shaping surface and the temperature of the glass sheet is such that the glass sheet is susceptible of sagging intermediate its said supported side portions, thereby inhibiting the sagging in said portion of the glass sheet subjected to said pressurized fluid while the glass sheet is exposed to an environment sufficiently hot to cause the glass sheet to develop undesired cross-sag.

2. In apparatus for bending a glass sheet to non-uniform radii of curvature about its transverse axis with a minimum of cross-sag and for tempering the bent sheet comprising:

(1) an outline mold having an elongated upper shaping surface formed thereon conforming in elevation and outline to the shape desired for the bent glass, (2) a tunnel-like furnace comprising a preheating zone and a bending zone in end-to-end relation along its length, (3) a carriage for supporting said mold, (4) a tempering station beyond the bending zone of said tunnel-like furnace, (5) conveyor means for conveying said carriage through said tunnel-like furnace and said tempering station, (6) heating elements arranged in rows and columns along the length of said furnace for heating different longitudinal increments of the glass, and (7) control elements operatively coupled to each said heating element to control the thermal output of the latter, the improvement comprising (8) means to supply hot fluid to said bending zone in an upward direction only comprising a plurality of nozzles having exit orifices at their upper end and located below a position occupied by the longitudinal center portion only of a bent glass sheet in said bending zone, said exit orifices facing in an upward direction, (9) means for supplying hot fluid under pressure, and

(10) means interconnecting said hot fluid supply means to said nozzles to furnish hot fluid under pressure through said exit orifices in an upward direction.

3. The improvement according to claim 2, wherein said nozzles comprise a plurality of thin, elongated parallel slots.

4. A bending zone of a glass bending furnace comprising in combination a station, means for moving a glass bending mold supporting an elongated sheet horizontally into said station through said bending zone and for moving said mold out of said station, heaters mounted in said bending zone for radiating heat onto said sheet, a plurality of parallel, elongated nozzles located centrally of and immediately beneath said station, exit orifices at the upper end of said nozzles facing in an upward direction, means for providing heated fluid under pressure, and means communicating said last named means to said plurality of nozzles to supply heated fluid under pressure in an upward direction through the exit orifices of said nozzles toward the central portion only of said station.

5. A method of bending and tempering a glass sheet comprising:

(1) supporting an unbent glass sheet in shaping relation to a curved, outline shaping surface conforming in elevation and outline to the shape desired for the sheet after bending, (2) subjecting the sheet to radiant energy to raise its temperature substantially above 1150 degrees Fahrenheit to soften the heated glass sheet so that its marginal portion adjacent its entire periphery is brought into continuous contact with said curved shaping surface and wherein the heated sheet tends to sag intermediate the side edge portions of its said marginal portion supported on said curved outline shaping surface, (3) applying a fluid heated to a temperature between about 1100 degrees Fahrenheit and about 1150 degrees Fahrenheit in an upward direction only against only the portion of the undersurface of the heated glass sheet that tends to sag below said shaping surface at a rate of flow sufficient to cause the undersurface of the glass sheet after bending to be cooler than its top surface, and (4) suddenly chilling both surfaces of the bent, heated glass sheet while its upper surface is at a higher temperature than its undersurface and while the bent glass sheet is sufficiently hot to be tempered by said sudden chilling.

6. In apparatus for bending a glass sheet with a minimum of cross-sag, a heating zone for receiving a mold supporting a glass sheet thereon, heating means disposed within said zone for heating said glass sheet to its deformation temperature, said mold having a shaping surface of outline configuration conforming to the shape desired for said glass sheet after bending, and means for supplying heated fluid to an interior portion of a surface of said glass sheet within an area defined and encompassed by said shaping surface of outline configuration and spaced inward from said outline at a pressure sufficient to support said area of said glass sheet against substantial cross-sag, said shaping surface supporting said bent glass sheet along its marginal portion adjacent its entire periphery.

References Cited by the Applicant

UNITED STATES PATENTS

| 2,237,343 | 8/1941 | Engels | 65—114 |
| 2,646,647 | 7/1953 | Bamford et al. | 65—103 |
| 3,123,344 | 3/1964 | Ross | 65—107 X |
| 3,223,499 | 12/1965 | Cypher et al. | 65—25 |

FOREIGN PATENTS

| 205,170 | 4/1955 | Australia. |

DONALL H. SYLVESTER, *Primary Examiner.*

A. D. KELLOGG, *Assistant Examiners.*